Sept. 21, 1937. C. M. O'NEIL 2,093,475
PISTON SKIRT EXPANDER
Filed June 17, 1935
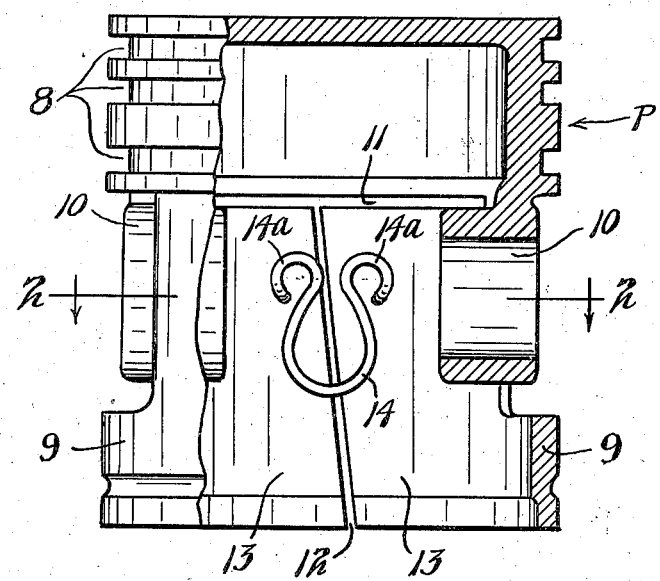
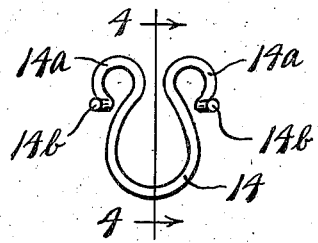
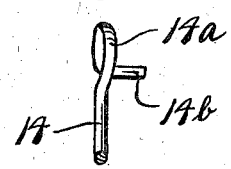
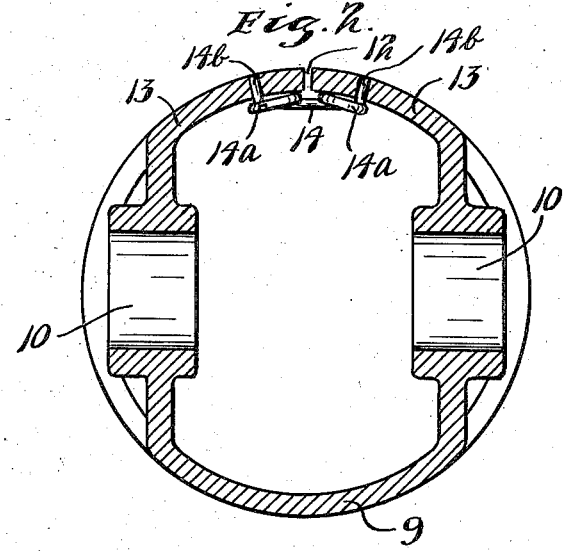
INVENTOR.
CHARLES M. O'NEIL.
BY HIS ATTORNEYS.
Williamson & Williamson Patented Sept. 21, 1937

2,093,475

UNITED STATES PATENT OFFICE 2,093,475

PISTON SKIRT EXPANDER

Charles M. O'Neil, Hopkins, Minn.

Application June 17, 1935, Serial No. 26,962

3 Claims. (Cl. 309—12)

This invention relates to resilient expanders for split pistons of internal combustion engines and is an improvement on the "Piston skirt expander" disclosed in my Patent No. 1,850,214 granted March 22nd, 1932.

In my said patent a simple, compact and successful device was disclosed for resiliently expanding a piston skirt, to prolong its usefulness, to eliminate the objectionable "piston slapping" at a minimum expense and effort and to reduce leakage or pumping of oil through wearing of the edges of piston rings because of piston slapping.

It is an object of my present invention to provide an improved piston skirt expander having greater resiliency and range of adjustability for expansive force exerted by the spreading action of a generally U-shaped member and which prolongs the life and effective operation of the device in use upon pistons of internal combustion engines.

More specifically it is an object of my invention to provide improvements on my original expander which are responsible for a more perfect installation of the expander in various positions and with various degrees of expansive force in the skirt of a split piston and which will withstand harder wear and greater compressibility in installation than my original device.

These and other objects and advantages of the invention will be more fully set forth in the following description made in connection with the accompanying drawing, in which like reference characters refer to similar parts throughout the several views, and in which:—

Fig. 1 is a view partly in vertical section and partly in side elevation of a conventional type of slotted piston having one of my improved expanders operatively applied to the inner wall of the piston skirt;

Fig. 2 is a cross sectional view taken approximately on the line 2—2 of Fig. 1;

Fig. 3 is a front elevation of one of my improved expanders detached from the piston, and Fig. 4 is a vertical sectional view taken approximately on the line 4—4 of Fig. 3.

In the drawing one of my improved expanders is shown operatively applied to a piston P of a conventional type widely used in internal combustion engines at this time. Said piston comprises a solid head portion having the annular grooves 8 formed therein for reception of the piston rings and having a depending skirt 9 of thinner construction provided with the usual wrist pin bosses or bearings 10 oppositely disposed and as shown integrally formed with the skirt.

The skirt 9 is in part separated from the solid head by a cross slot 11 and is split by a longitudinal slot 12 as shown slightly inclined from the vertical and joining or intersecting slot 11 at its upper end and thus forming a pair of flexible wings 13 included in the structure of the skirt. The slotted construction of the piston skirt with the T-slot formed by slots 11 and 12 enables the skirt to yieldably contact with the cylinder wall of the engine.

It is a fact, however, that unless the piston is perfectly fitted or if a properly fitted piston has become worn through extensive use the diameter of the skirt is reduced slightly causing a tilting of the piston in its reciprocating movement and producing what is commonly known as "piston slap". Furthermore, the slapping of the piston quickly wears the edges of the piston rings because of the said tilting movement and such wear produces leakage of oil or "oil pumping" which is very objectionable and lessens the efficiency of the engine. The general purpose of my improved piston expander is, of course, to slightly spread the slotted portions of the piston skirt to yieldably compensate and take up for wear thereby eliminating piston slapping and further to prevent wear of the edges of the piston rings and consequently leakage or pumping of oil.

My improved expander is in the general form of a U constructed preferably from an integral spring member which can be formed from heavy spring wire and the U-shaped body 14 of which lies substantially in a plane. The upper portions of the legs of the U converge but are spaced apart and thereafter the spring member on each of the legs is curved outwardly forming open loops 14a, which loops extend in planes angled with respect to each other slightly to nicely conform to the concave inner wall of a piston. The extremities of the spring member are out-turned to form attachment lugs 14b which extend substantially normal to the planes of the respective loops and which are horizontally aligned but diverge slightly as clearly shown in Figs. 2 and 3. It will be noted that the loops 14a are open, that is, the lugs 14b are spaced some distance from the legs of the U-shaped body 14 and are formed by a reverse curve whereby compressibility of the device through the bringing together of attachment lugs 14b and resultant expansive force is obtained both through the bent U-shaped body 14 and the open loops 14a which are a continuation of said body with the loops curved outwardly in such direction as to continue the effectiveness of expansive force on the lugs 14b when the device is compressed or tensioned.

In installing my improved expander in a piston, a pair of holes are drilled on opposite sides of the slot 12 and aligned circumferentially of the piston skirt and spaced apart less distance than the normal distance between attachment lugs 14b. The lug-receiving holes are drilled more or less radially of the periphery of the piston skirt to receive and retain the diverging attachment lugs 14b.

In inserting the expander the attachment lugs 14b must be compressed or sprung together which is readily accomplished by utilizing a suitable plier for engaging said lugs and tensioning the expander by resiliently bending the U-shaped body 14 and further resiliently bending the curved portions of the loops 14a. With the expander suitably compressed and tensioned the lugs are fitted into the receiving holes of the piston and the pliers or other tensioning means released and the body of the expander is then forced close to the inner wall of the piston, the body lying in a plane engaging against the piston wall as well as the outer surfaces of the loops 14a which also bear against the piston wall. Any excess length of the lugs 14b over the thickness of the piston skirt wall is filed away or clipped at the exterior periphery of the piston so that the extremities of the lugs will not project beyond the skirt.

It will be obvious that my improved expander may be applied at various heights with regard to the skirt 9 whereby considerable adjustment may be obtained in the manner in which the slotted portion of the skirt is spread. When applied at a particular height with reference to the particular skirt on which installed uniform expansion of the slot 12 may be obtained from top to bottom. In some instances it is desirable to expand the skirt more or less at the lower end than at the upper end, which may be accomplished in accordance with the requirements by locating the expander at one height for so doing. In some instances it is desirable to use two or more expanders to produce the amount of expansive force required. In this connection, the expansive force exerted by one expander may be varied within fairly wide limits by varying the distance apart of the two holes drilled on opposite sides of slot 12. The closer together said holes are drilled the more the expander must be tensioned and the more compression must be placed upon the diverging lugs 14b through flexing of body 14 and loops 14a to install the attachment lugs in the holes and consequently the more the expansive force exerted when compression is released.

It will be noted that the forming of the loops 14a in planes angled slightly with reference to one another and with reference to the plane of the main portion of the expander permits the expander to more perfectly fit the concave contour of the inner piston wall than was possible with my original expander and also affords greater bearing surface protecting the joints of the lugs with the loops or body of the piston from excessive wear.

It further will be noted that considerably greater resiliency and consequently greater variance in expansive force is obtained through the combination of the outwardly curved loops 14a in cooperation with the larger loop formed in the body of the expander than was present in my original device. It moreover will be noted that the outward curving of the loops 14a has a distinct advantage over inward curving of such loops in that expansive force and variance in resiliency is materially increased by the outwardly extending loops whereas if the loops were curved inwardly the grain or lines of the spring member would be reversed upon the inward bending of the loops from the standpoint of applying expansive force when compressed.

In manufacturing my improved expander the bending of the wire or elongated spring member is usually performed before the same is tempered and drawn, enabling the bends to be perfectly formed without danger of breakage. Thereafter the device may be hardened and drawn to the proper temper to produce the desired resiliency.

From the foregoing description it will be seen that I have provided a compact, simple and improved piston expander which affords greater resiliency and opportunity for variance in expansive force than in my original expander, disclosed in Patent No. 1,850,214 and an expander which may be readily installed, in split skirt pistons of all conventional types, which is fitted compactly against the inner wall of the piston out of the way of the wrist pins and connecting rods and which will fit pistons of all diameters and dimensions.

It will, of course, be understood that various changes may be made in the form, details, proportions and arrangement of the parts, without departing from the scope of my invention, which, generally stated, consists in a device capable of carrying out the objects above set forth, and in the novel parts and combinations of parts disclosed and defined in the appended claims.

What is claimed is:—

1. A piston skirt expander comprising a curved spring member the end portions of which are spaced apart, said member having a body portion adapted to be positioned in close relation to the inner wall of the slotted piston and traversing the slot, the end portions of said member being curved outwardly terminating in a pair of projecting attachment lugs spaced from said body portion and spaced apart a short distance, said lugs being adapted for engagement with portions of said piston skirt on opposite sides of said slot with said spring member tensioned.

2. In combination with a piston having a skirt provided with a slot to permit expansion, an expander comprising a curved spring member, the body of which lies substantially in a plane extending vertically against the inner wall of said piston skirt, said spring member having a pair of outwardly curved portions adjacent the outer ends thereof, the curves of which extend reversely to the curve of said body portion and a pair of lugs extending each from one of said last mentioned curved portions, said lugs extending at angles to the plane of said body and being connected with portions of said piston skirt on opposite sides of said slot with said spring member tensioned.

3. In combination with a piston having a skirt provided with a slot to permit expansion, an expander comprising a spring member having a U-shaped body portion lying substantially in a vertical plane against the inner wall of said piston skirt, said member having outwardly curved open loops at its end portions which loops are adapted to bear against said piston skirt, said loops terminating in a pair of spaced diverging lugs extending substantially normal to the planes defined by said loops and being spaced outwardly of said body member, said lugs engaging portions of said piston skirt at opposite sides of said slot with said spring member tensioned.

CHARLES M. O'NEIL.